United States Patent Office 2,698,752
Patented Jan. 4, 1955

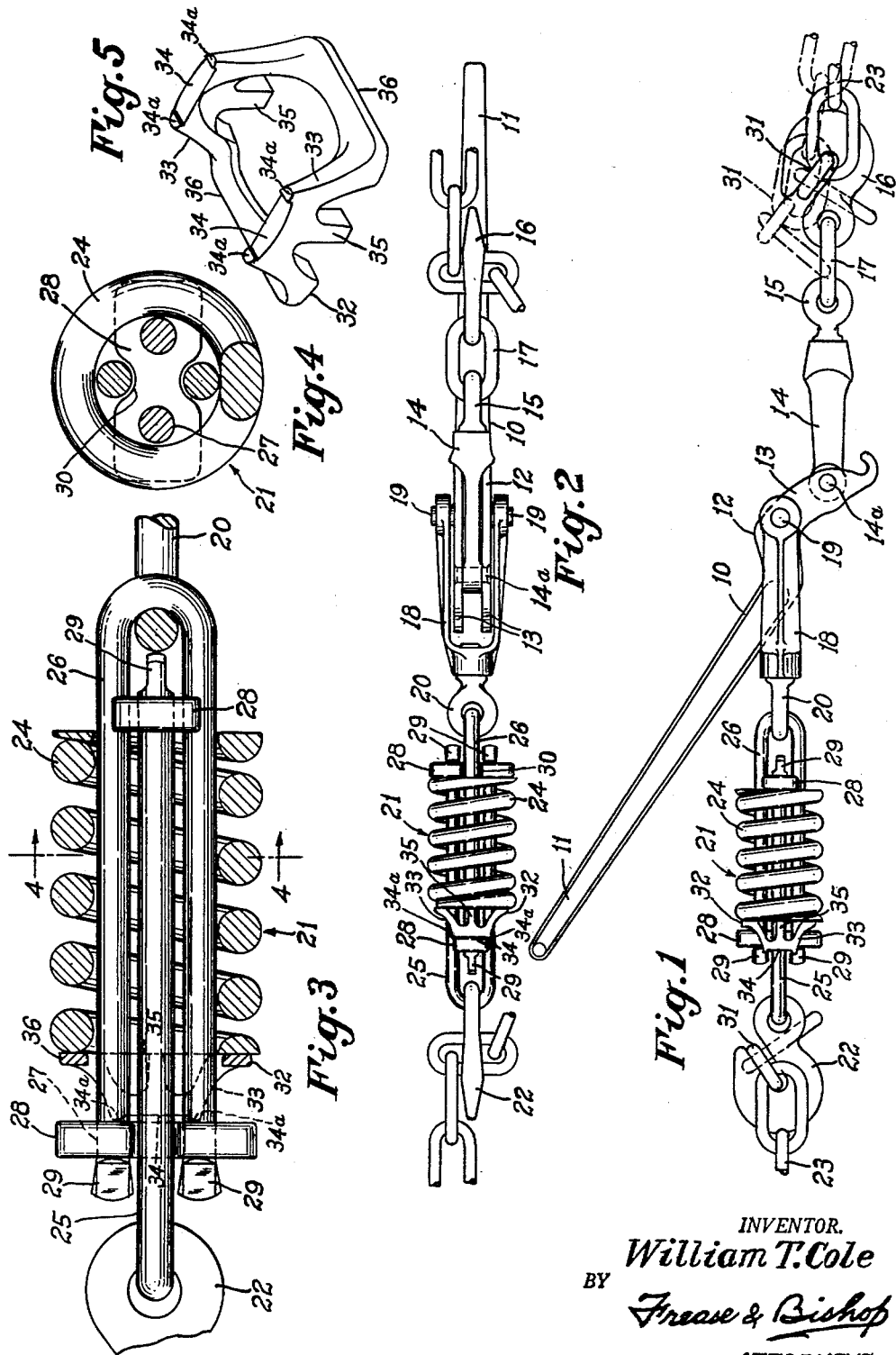

2,698,752
SPRING MOUNT

William T. Cole, Canton, Ohio, assignor to The Canton Cast Products Company, Canton, Ohio, a corporation of Ohio Application September 23, 1952, Serial No. 311,133

6 Claims. (Cl. 267—72)

The invention relates to improvements in spring mounts, and more particularly to such a device especially adapted for use as a shock absorber or yieldable connection upon load binders.

Such a shock absorber is shown in Juline Patent No. 1,972,346 of September 4, 1934, in which two oppositely facing loops or U-shaped members, disposed at right angles to each other, are located within a coil spring, each loop terminating in reversely bent hooks embracing the opposite ends of the coil springs.

Such a construction of shock absorber is not entirely satisfactory, first for the reason that it is necessary to form the reversely bent hooks after the loops or U-shaped members are inserted within the coil spring, making it a difficult operation.

Also, when the spring is placed under compression, there is a tendency for the reversely bent hooks to open or straighten out and since these reversely bent hooks are the only means for holding the spring under compression, the device will fail as a shock absorber or yieldable connection for such purposes.

Furthermore, in the use of such load binders, when the chains are first attached to the hooks at opposite ends of the load binder, in order to engage the chains with said hooks, each chain is pulled as taut as possible to engage a link thereof over the end of the adjacent hook. Then as this link is pulled back into the hook a certain additional amount of slack is produced in the chains. No means is provided in load binders now in use for taking up this initial slack prior to the operation of the usual actuating lever of the load binder, whereby the maximum tension upon the chains cannot be attained.

The object of the present invention is to provide an easily assembled, efficient, strong and durable spring mount for such shock absorbers or flexible connections.

Another object is to so construct the device that regardless of the compression upon the spring, the device will not fail.

A further object is to provide such a spring mount in which the free ends of each loop or U-shaped member within the coil spring are located through openings in transversely disposed flat bars engaging opposite ends of the spring and pinched or compressed in one direction so as to be expanded or enlarged in a direction at right angles thereto, firmly securing the bars upon the loops.

A still further object is to provide such a device in which each of the flat bars is reduced in cross section at its central point so as to move freely between the legs of the other loop or U-shaped member.

It is also an object to provide means for taking up the initial slack in the chains, prior to the operation of the actuating lever of the load binder, whereby the maximum efficiency of the device may be obtained.

Another object of the invention is to provide a rotatable cam cooperating with the coil spring of the load binder to take up the initial slack in the chains after they are hooked to opposite ends of the load binder.

The above objects together with others which will be apparent from the drawings and following description, or which may be later referred to, may be attained by constructing the improved spring mount in the manner hereinafter described in detail and illustrated in the accompanying drawings, in which:

Fig. 1 is a side elevation of a load binder in open position, showing a shock absorber or yieldable connection with take-up cam in the initial position;

Fig. 2 is an elevation of the load binder in operated or load binding position, with the take-up cam upon the shock absorber rotated to the operated position, viewed at right angles to the position shown in Fig. 1;

Fig. 3 is an enlarged, longitudinal, sectional view through the shock absorber or flexible connection with take-up cam embodying the invention;

Fig. 4 is a transverse, sectional view through the same, taken as on the line 4—4, Fig. 3; and, Fig. 5 is a detached, perspective view of the take-up cam.

By way of example the improved shock absorber or yieldable connection is shown in combination with a conventional type of load binder comprising the actuating lever 10 having one end shaped to constitute a handle 11 by means of which the tool may be operated to bind or release a load, while the other end may be offset as at 12.

The offset end of the actuating lever may be slotted or bifurcated to form spaced ears 13 between which may be pivoted a link 14, as indicated at 14a, having an eye 15 swiveled therein to which a hook 16 may be connected, either directly or through a link 17, as in conventional practice.

A clevis 18 is pivotally connected to the offset portion 12, as by the trunnions 19, and as in usual practice, an eye 20 may be swiveled upon the end of the clevis. The yieldable connection or shock absorber, to which the invention pertains, is indicated generally at 21 and is shown as interposed between the eye 20 and the hook 22.

The hooks 16 and 22 are adapted to be connected to the opposing ends of the chain 23 securing the load to be bound as in usual practice.

The shock absorber or yieldable connection 21 functions to automatically take up slack in the chain as well as to absorb any shocks or strains to which the load binder may be subjected.

The shock absorber includes a coil spring 24 having the oppositely facing loops or U-shaped members 25 and 26 located therethrough and disposed at right angles to each other. The free ends of each loop or U-shaped member are located through suitable apertures 27 in a flat bar 28 and are pinched or compressed in one direction, so as to be expanded in a direction at right angles thereto, as shown at 29, preventing these enlarged ends from being withdrawn through the apertures in the bar.

Each bar 28 bears against one end of the spring 24, as shown in the drawings, so that when the actuating lever 10 is operated to draw the ends of the chain 23 toward each other around the load, the spring will be placed under compression.

In order that each bar 28 may slidably move within the other loop or U-shaped member, the central portions of the bars may be reduced in cross section, as indicated at 30, to accommodate the legs of the other loop or U-shaped member.

With the load binder in the open position, as shown in Fig. 1, the chains 23 are pulled as taut as possible by hand and hooked over the hooks 16 and 22 at opposite ends of the load binder.

It will be apparent that as each chain is hooked to these hooks the chain must be pulled toward the load binder until a link thereof, as indicated in broken lines at 31 in Fig. 1, can be passed over the end of the hook. Then as these links are pushed back into the hooks, to the full line positions shown in Fig. 1, a certain amount of additional slack will be produced in the chains 23, after they are hooked to the load binder.

For the purpose of taking up this initial slack in the chains, so that the coil spring 24 may function at maximum efficiency when the lever 10 is actuated to operate the load binder and tighten the chains around the load, means is provided for taking up this initial slack in the chains.

This device comprises a rotatable take-up member 32, interposed between one end of the coil spring 24 and the adjacent bar 28. As best shown in Fig. 5, this member is in the form of a ring having the diametrically opposed, tapered projections 33, each having a flat top surface 34 and a depending foot 35 terminating in the plane of the rim flange 36. A lug 34a may be formed at each end of the flat top surface 34.

Normally this take-up ring is positioned as shown in Fig. 3, with the rim flange 36 abutting the adjacent end of the coil spring 24, and the projections 33 located on opposite sides of the adjacent flat bar 28.

With the ring in this position, when it is desired to operate the load binder to tighten the chains around a load, the lever 10 of the load binder is swung to the position shown in Fig. 1, to move the load binder to open position, extending the hook 16 thereof the maximum distance from the hook 22.

One chain 23 is hooked onto one of the hooks of the load binder, as shown at the left end of Fig. 1, by hooking a link 31 of the chain into the hook 22. The chains are pulled toward each other as tautly as possible and a link 31 of the other chain is pulled over the point of the hook 16, as shown in broken lines at the right end of Fig. 1. Then as this link 31 is dropped back into the hook 16, as shown in full lines, it will be evident that some slack is produced in the chains.

In order to take up this slack the U-shaped members 25 and 26 of the shock absorber are pushed toward each other as shown in Fig. 3 and the take-up ring 32 is then rotated a quarter turn, to the position shown in Fig. 2, positioning the projections 33 thereof beneath the opposite end portions of the adjacent bar 28, the lugs 34a being located at opposite sides of the bar 28 to prevent turning movement of the take-up ring. This causes the spring 24 to be moved longitudinally toward the other end of the shock absorber, to the position shown in Fig. 2, taking up this initial slack, so that when the lever 10 is swung to the closed position, shown in Fig. 2, the maximum efficiency of the spring 24 will be obtained in binding the chains tightly around the load.

From the above it will be obvious that a simple, efficient and durable spring mount is provided for a shock absorber or yieldable connection of the character shown.

It will also be seen that the bars 28 may be securely attached to the free ends of the loops or U-shaped members 25 and 26 and will be held firmly against displacement therefrom.

Furthermore, it will be apparent that a simple and effective means is provided for taking up initial slack in the chains, after they are hooked onto the load binder, so as to obtain the maximum load binding efficiency of the device.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. In a chain load binder, a yieldable connection comprising a coil spring, a pair of oppositely facing U-shaped members located through the coil spring and disposed at right angles to each other, and transversely disposed bars beyond the ends of the spring, means connecting the ends of the U-shaped members to said bars, and a take-up ring interposed between one end of the coil spring and the adjacent bar and having spaced projections normally located upon opposite sides of the adjacent bar and adapted to contact the adjacent surface of the bar to compress the spring.

2. In a chain load binder, a yieldable connection comprising a coil spring, a pair of oppositely facing U-shaped members located through the coil spring and disposed at right angles to each other, and transversely disposed bars beyond the ends of the spring, means connecting the ends of the U-shaped members to said bars, and a take-up ring rotatably mounted upon the U-shaped members and interposed between one end of the coil spring and the adjacent bar, and diametrically opposite projections upon the take-up ring normally located on opposite sides of the adjacent bar and adapted to contact the adjacent surface of the bar to compress the spring.

3. In a chain load binder, a yieldable connection comprising a coil spring, a pair of oppositely facing U-shaped members located through the coil spring and disposed at right angles to each other, and transversely disposed bars beyond the ends of the spring, means connecting the ends of the U-shaped members to said bars, and a take-up ring rotatably mounted upon the U-shaped members and interposed between one end of the coil spring and the adjacent bar, said take-up ring comprising a ring having diametrically opposite projections on one side thereof normally located on opposite sides of the adjacent bar and adapted to contact the adjacent surfaces of the bar to compress the spring.

4. In a chain load binder, a yieldable connection comprising a coil spring, a pair of oppositely facing U-shaped members located through the coil spring and disposed at right angles to each other, and transversely disposed bars beyond the ends of the spring, means connecting the ends of the U-shaped members to said bars, and a take-up ring rotatably mounted upon the U-shaped members and interposed between one end of the coil spring and the adjacent bar, said take-up ring comprising a rim flange for contact with one end of the spring and diametrically opposite projections on one side thereof normally located on opposite sides of the adjacent bar and adapted to contact the adjacent surface of the bar to compress the spring.

5. In a chain load binder, a yieldable connection comprising a coil spring, a pair of oppositely facing U-shaped members located through the coil spring and disposed at right angles to each other, and transversely disposed bars beyond the ends of the spring, means connecting the ends of the U-shaped members to said bars, and a take-up ring rotatably mounted upon the U-shaped members and interposed between one end of the coil spring and the adjacent bar, said take-up ring comprising a rim flange for contact with one end of the coil spring, and diametrically opposite projections normally located on opposite sides of the adjacent bar and having flat top surfaces for contact with the adjacent bar to compress the spring.

6. In a chain load binder, a yieldable connection comprising a coil spring, a pair of oppositely facing U-shaped members located through the coil spring and disposed at right angles to each other, and transversely disposed bars beyond the ends of the spring, means connecting the ends of the U-shaped members to said bars, and a take-up ring rotatably mounted upon the U-shaped members and interposed between one end of the coil spring and the adjacent bar, said take-up ring comprising a rim flange for contact with one end of the coil spring, diametrically opposite projections normally located on opposite sides of the adjacent bar and having flat top surfaces for contact with the adjacent bar to compress the spring and lugs at opposite ends of the flat top surfaces for contact with opposite sides of said bar.

References Cited in the file of this patent

UNITED STATES PATENTS

| | | |
|---|---|---|
| 208,482 | Miller | Oct. 1, 1878 |
| 576,958 | Field | Feb. 9, 1897 |
| 1,086,217 | Rasmussen | Feb. 3, 1914 |
| 1,600,101 | Ekre | Sept. 14, 1926 |
| 1,876,138 | Fassett | Sept. 6, 1932 |
| 1,956,342 | Brubaker | Apr. 24, 1934 |